US006323601B1

United States Patent
Klein et al.

(10) Patent No.: US 6,323,601 B1
(45) Date of Patent: Nov. 27, 2001

(54) REFLECTOR FOR AN ULTRAVIOLET LAMP SYSTEM

(75) Inventors: Richard G. Klein, Avon Lake; James W. Schmitkons, Lorain, both of OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 09/659,075

(22) Filed: Sep. 11, 2000

(51) Int. Cl.[7] .................................................. H05B 41/16
(52) U.S. Cl. ........................ 315/248; 315/39; 362/341; 362/347; 313/113; 313/231.61
(58) Field of Search .............................. 315/39, 248, 267, 315/344, 111.21; 362/296, 297, 341, 347, 350; 313/110, 113, 231.31, 231.61

(56) References Cited

U.S. PATENT DOCUMENTS

| 4,042,850 | 8/1977 | Ury et al. ........................... 315/39 |
| 4,355,350 | * 10/1982 | Mader ................................. 362/347 |
| 4,535,753 | 8/1985 | Zayauskas ........................... 126/274 |
| 4,887,008 | * 12/1989 | Wood ................................... 315/39 |
| 4,928,040 | 5/1990 | Uesaki ................................ 315/248 |
| 4,990,789 | 2/1991 | Uesaki ............................. 315/248 X |
| 5,136,491 | 8/1992 | Kano .................................. 362/346 |
| 5,980,067 | * 11/1999 | Albou et al. ....................... 362/303 |

* cited by examiner

Primary Examiner—Haissa Philogene
(74) Attorney, Agent, or Firm—Wood, Herron & Evans, LLP

(57) ABSTRACT

A reflector for use in an ultraviolet or other type of lamp system having a plasma bulb. The reflector includes one or more longitudinally extending reflector panels having a characteristic shape that advantageously reflects ultraviolet radiation emanating from the bulb to provide a uniform irradiance over a relatively large surface area of a substrate. A substantial portion of each reflector panel has a characteristic shape described by the equation $(x/a)^{(2+n)}+(y/b)^{(2+m)}=1$, where a and b are constants and n and m are exponents that range between 0 and 2.

16 Claims, 3 Drawing Sheets

REFLECTOR FOR AN ULTRAVIOLET LAMP SYSTEM

FIELD OF THE INVENTION

The present invention relates generally to ultraviolet lamp systems and, more particularly, to a reflector for use in such lamp systems to reflect ultraviolet radiation generated by a plasma bulb mounted within the system.

BACKGROUND OF THE INVENTION

Ultraviolet lamp systems are designed for coupling microwave energy to an electrodeless lamp, such as an ultraviolet plasma bulb, mounted within a microwave cavity or microwave chamber of the lamp system. In ultraviolet lamp heating and curing applications, one or more magnetrons are typically provided in the lamp system to couple microwave radiation to the plasma bulb within the microwave chamber. The magnetrons are coupled to the microwave chamber through waveguides that include output ports connected to an upper end of the chamber. When the plasma bulb is sufficiently excited by the microwave energy, it emits a spectrum of radiation having strong ultraviolet and infrared components through a bottom end of the microwave chamber toward a substrate to be illuminated. Typically, the ultraviolet lamp system also includes a metallic mesh screen mounted to the bottom end of the chamber that is transmissive to ultraviolet radiation but is opaque to the microwaves generated by the magnetrons. It will be appreciated that the terms "upper end" and "bottom end" are used herein to simplify description of the microwave chamber in connection with the orientation of the chamber as shown in the figures. Of course, the orientation of the microwave chamber may change depending on the particular ultraviolet lamp heating or curing application without altering the structure or function of the microwave chamber in any way.

The plasma bulb presents an approximate line source of a characteristic spectrum emitting radiation isotopically outward along its length. A portion of the emitted radiation moves directly from the plasma bulb toward the substrate without reflection. However, a large portion of the emitted radiation can only reach the substrate by undergoing one or more reflections. Ultraviolet lamp systems used in curing or heating of adhesives, sealants, inks or coatings, for example, include a reflector mounted within or that forms a part of the microwave chamber in which the plasma bulb is positioned. The reflector is an optical element operable to direct the reflected radiation in a predetermined pattern toward the substrate.

In most ultraviolet lamp systems, cold-light illumination of the substrate is desired in which the infrared component of the radiation emitted by the plasma bulb has been removed by absorption or reflection filters within the system. Infrared radiation interacts with the substrate to heat the irradiated surface. Therefore, the preferred reflector in such systems selectively reflects and transmits radiation as a function of wavelength. In particular, the reflector may be a coated optical element having a wavelength-selective coating that preferentially directs the ultraviolet radiation onto the substrate. Wavelength-selective coatings are typically multi-layered thin films of dielectric materials applied by vacuum deposition techniques familiar to one skilled in the art, such as physical vapor deposition or chemical vapor deposition. Radiation having wavelengths in the infrared range are transmitted through the reflector and absorbed by a surrounding structure to be dissipated thermally. Therefore, the extraneous infrared radiation is not substantially reflected by the reflector and does not illuminate the substrate.

The geometrical shape of the reflector determines the pattern of the radiation that illuminates the substrate. Reflectors are commonly shaped as a fragment of a conic section, such as a parabolic, elliptical, hyperbolic or circular section that is created when a solid cone is intersected by a plane. An elliptical reflector is commonly used to deliver a focused beam of ultraviolet radiation to the substrate, which is located at or near the focal plane of the reflector. A characteristic of an elliptical reflector is that a ray of radiation emitted from a source positioned at one focus will pass through the other focus after a single reflection. Thus, an elliptical reflector having a plasma bulb positioned axially along one focus will deliver a relatively focused line of radiation to a substrate positioned at or near the second focus.

Some applications for ultraviolet lamp systems, on the other hand, require a uniform irradiance or radiant flux density over a relatively large surface area of the substrate. A parabolic reflector having a source of radiation positioned at the focal point of the parabola would be ideal for such an application. Indirect radiation emitted from such a line source of the parabolic reflector will be reflected as a homocentric bundle of parallel rays toward a focal plane positioned at infinity. However, a parabolic reflector is relatively wide due to the mathematical description ascribed to the parabolic surface and, in most instances, a parabolic reflector will not physically fit within the available space in most microwave chambers.

In the past, designs of ultraviolet lamp systems have attempted to deliver a uniform irradiance by adjusting the optics of the reflector-plasma bulb-substrate configuration. One proposed solution to provide for a more compact reflector was to relocate the plasma bulb away from the focal point of an elliptical reflector. Although the ultraviolet radiation reflected by this configuration was at least partially defocused, the irradiance was not satisfactorily uniform across the surface area of the substrate. Moreover, the coupling between the incident microwave energy and the gas inside the plasma bulb is altered so that the radiation output from the bulb along its length is non-uniform. Another proposed solution was to reposition the elliptical reflector so that the substrate is no longer at or near the focal plane. However, repositioning the reflector reduced the available cooling for the plasma bulb and, concomitantly, reduced the useful lifetime of the bulb.

Thus, there is a need for a reflector that is configured to efficiently provide a uniform irradiance of ultraviolet radiation over a large area and that can do so without interfering with the optimum dimensions of the microwave chamber or adversely affecting the operating characteristics of the plasma bulb.

SUMMARY OF THE INVENTION

The present invention overcomes the foregoing and other shortcomings and drawbacks of reflectors heretofore known in microwave excited ultraviolet lamp systems. While the invention will be described in connection with certain embodiments, it will be understood that the invention is not limited to these embodiments. On the contrary, the invention includes all alternatives, modifications and equivalents as may be included within the spirit and scope of the present invention.

According to the present invention, the reflector comprises one or more longitudinally extending reflector panels adapted to be mounted in spaced relationship to a plasma bulb of an ultraviolet lamp system. The reflector is capable of reflecting electromagnetic radiation, and in particular ultraviolet radiation, generated by the bulb so as to provide a nearly uniform irradiance over the surface of an adjacent substrate. The curvature of a significant portion of each reflector panel is described in Cartesian coordinates by the equation $(x/a)^{(2+n)}+(y/b)^{(2+m)}=1$, where a and b are constants and where n and m are exponents smaller than about 2 and greater than or equal to 0, and at least one of n or m is greater than 0.

The curvature of the reflector efficiently provides a substantially uniform irradiance of ultraviolet radiation over a large area. Furthermore, the reflector can do so without interfering with the optimum dimensions of the microwave chamber and without adversely affecting the operating characteristics of the plasma bulb. Moreover, the reflector advantageously fits within the space available within the microwave chamber.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENT

Figure 1:
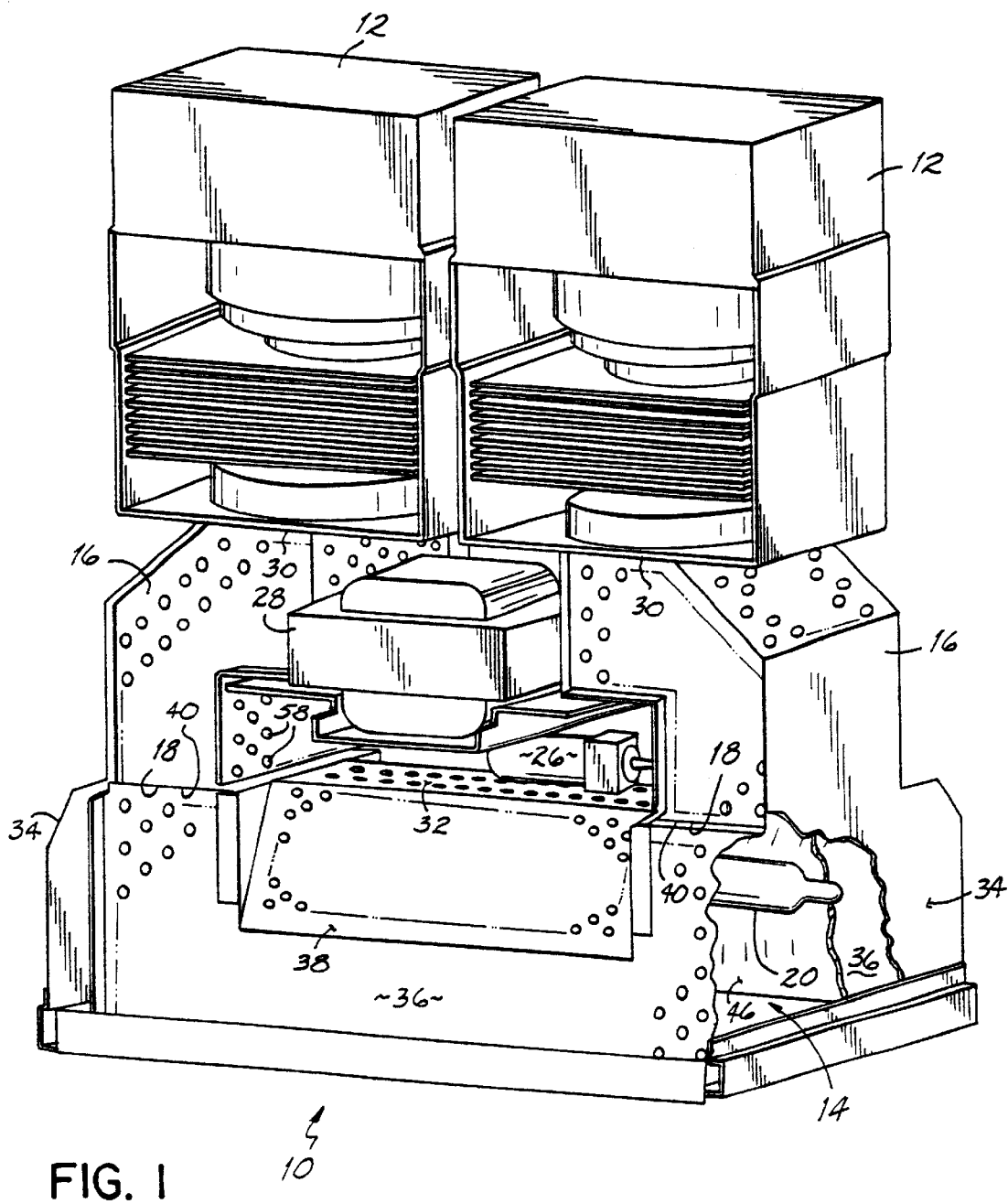
FIG. 1 is a perspective view of an ultraviolet lamp system in accordance with the principles of the present invention.

With reference to the figures, a microwave excited ultraviolet ("UV") lamp system 10 is shown in accordance with the principles of the present invention. Lamp system 10 includes a pair of microwave generators, illustrated as a pair of magnetrons 12, that are each coupled to a longitudinally extending microwave chamber 14 through a respective waveguide 16. Each waveguide 16 has an outlet port 18 coupled to an upper end of the microwave chamber 14. Microwave energy generated by the pair of microwave generators 12 is coupled to the microwave chamber 14 in spaced longitudinal relationship adjacent opposite upper ends of the chamber 14. An electrodeless plasma bulb 20, in the form of a hermetically sealed, longitudinally-extending tube, is mounted within the microwave chamber 14 and supported adjacent the upper end of the chamber 14 as is well known in the art. While not shown, it will be appreciated that lamp system 10 is mounted within a cabinet or housing well known to those of ordinary skill in the art that includes a source of pressurized air that is operable to direct air into the microwave chamber 14 to cool bulb 20.

Figure 2:
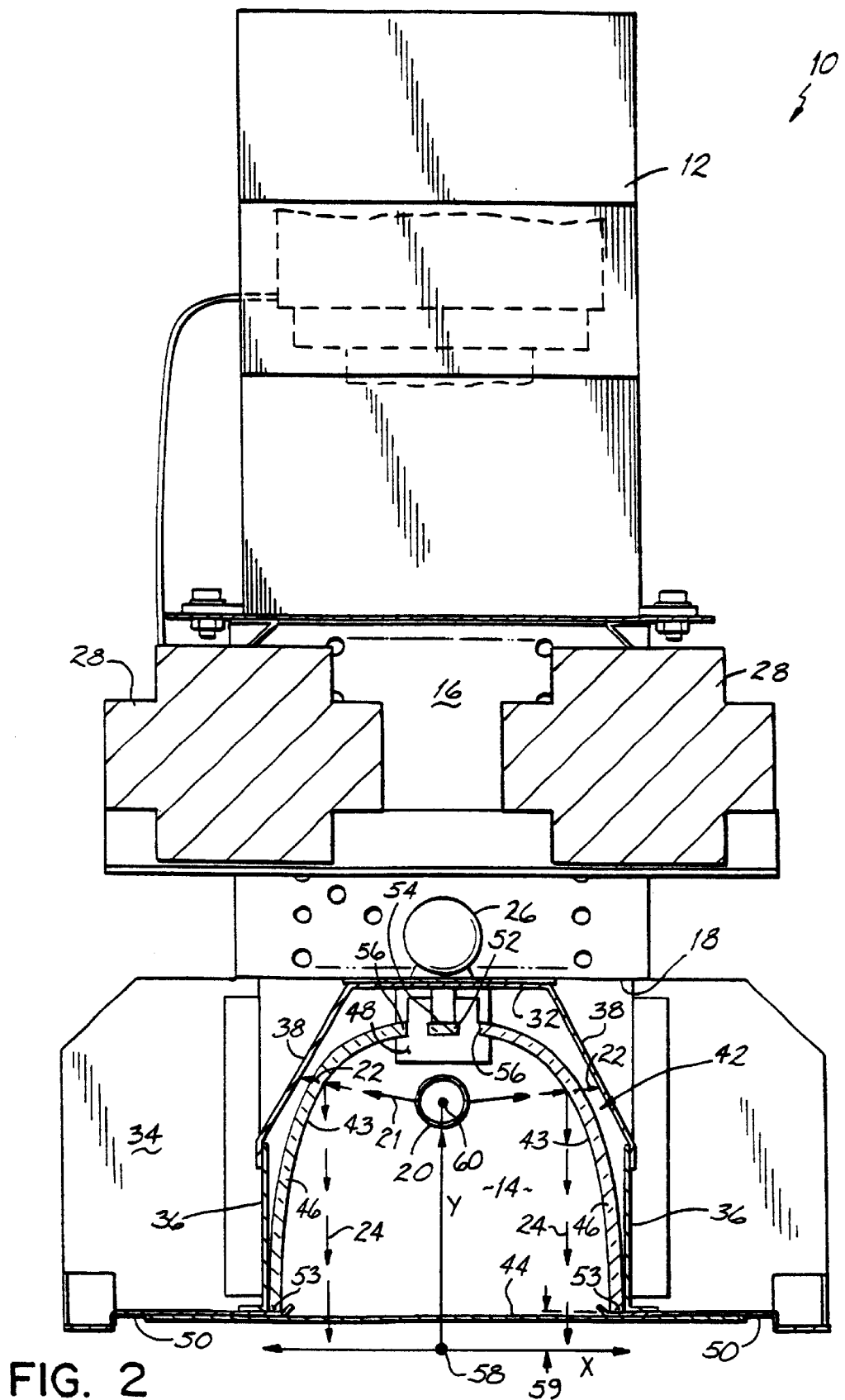
FIG. 2 is a cross-sectional view of the ultraviolet lamp system of FIG. 1 taken along line 2—2 of FIG. 1, showing one embodiment of a two-panel reflector for use in the lamp system of FIG. 1.

Lamp system 10 is designed and constructed to emit ultraviolet radiation, illustrated diagrammatically by arrows 24 in FIG. 2, from a bottom end of the microwave chamber 14 upon sufficient excitation of the gas in the plasma bulb 20 by microwave energy coupled to the microwave chamber 14 from the pair of magnetrons 12. While a pair of magnetrons 12 are illustrated and described herein, it is to be understood that the lamp system 10 may include only a single magnetron 12 to excite the gas mixture in plasma bulb 20 without departing from the spirit and scope of the present invention. The gas mixture of plasma bulb 20 is elementally tailored to produce a predetermined distribution of wavelengths in the emitted radiation. For these applications, an advantageous gas mixture is mercury vapor and argon, with trace elements such as iron. The electromagnetic radiation output by the excited gas mixture inside bulb 20 includes intense ultraviolet and infrared spectral components. As used herein, electromagnetic radiation (hereinafter radiation) is defined as radiation with wavelengths ranging between about 200 nm to about 1000 nm, ultraviolet radiation as radiation with wavelengths ranging between about 200 nm to about 400 nm and infrared radiation as radiation with wavelengths ranging between about 750 nm to about 1000 nm.

Lamp system 10 includes a starter bulb 26, and a pair of transformers 28 that are each electrically coupled to a respective one of the magnetrons 12 to energize filaments of the magnetrons 12 as understood by those skilled in the art. The magnetrons 12 are mounted to inlet ports 30 of the waveguides 16 so that microwaves generated by the magnetrons 12 are discharged into the chamber 14 through the longitudinally spaced apart outlet ports 18 of the waveguides 16. Preferably, the frequencies of the two magnetrons 12 are split or offset by a small amount to prevent intercoupling between them during operation of the lamp system 10. By way of specific example but not limitation, the two magnetrons 12 may operate at respective frequencies of about 2470 MHZ and about 2445 MHZ.

As best understood with reference to FIGS. 1 and 2, microwave chamber 14 includes a generally horizontal top wall 32, a pair of generally vertical opposite end walls 34, and a pair of generally vertical opposite side walls 36 that extend longitudinally between the end walls 34 and on opposite sides of the plasma bulb 20. Microwave chamber 14 further includes inclined walls 38 that extend upwardly and inwardly from the side walls 36 toward the top wall 32. A pair of openings 40 are provided at an upper end of the microwave chamber 14 that are aligned with and coupled to the outlet ports 18 of the waveguides 16. In this way, microwave energy generated by the pair of magnetrons 12 is coupled to the microwave chamber 14 to excite the gas mixture within bulb 20 with sufficient energy to induce gas atoms to emit a spectrum of radiation having significant ultraviolet and infrared components. Of course, other configurations of the microwave chamber 14 are possible without departing from the spirit and scope of the present invention. For example, opposed ends of bulb 20 may include, as is known, electrodes operably connected to a power supply for exciting the gas mixture by electric discharge.

In accordance with the principles of the present invention, a longitudinally extending reflector 42 is mounted within the microwave chamber 14 for preferentially reflecting ultraviolet radiation 24 from the spectrum of emitted radiation, illustrated diagrammatically by arrows 21 in FIG. 2, emanating from the plasma bulb 20 toward a substrate (not shown) positioned below the bottom end of the microwave chamber 14. A mesh screen 44 is mounted to the bottom end of the microwave chamber 14 that is transparent to ultraviolet radiation 24 while confining microwaves generated by the pair of magnetrons 12. Mesh screen 44 is composed of a metal having high electrical conductivity, preferably tungsten, and has a large transmission efficiency for the incident ultraviolet radiation 24, preferably greater than about 90%.

As shown in FIGS. 1 and 2, reflector 42 includes a pair of longitudinally extending reflector panels 46 that are mounted within the microwave chamber 14. Reflector panels have respective concave inner surfaces 43 positioned in an opposing and facing orientation and a spaced relationship relative to the plasma bulb 20. It is apparent that reflector 42 could comprise either a one-piece monolithic panel 46 or more than two panels 46 extending longitudinally in microwave chamber 14 in a spaced relationship relative to bulb 20 without departing from the spirit and scope of the present invention.

Each inner surface 43 preferably has an optically smooth finish and each reflector panel 46 is preferably constructed of a thickness of a radiation-transmissive material, such as PYREX®. Other materials having suitable reflective and thermal properties, such as a metal, may be used which, depending upon the specific application, are not required to be radiation-transmissive when used to form part of the microwave chamber 14.

For use in the ultraviolet lamp system 10, reflector 42 is operable for at least partially transmitting, reflecting or absorbing specific wavelengths in the radiation 21 emitted by plasma bulb 20. In particular, reflector 42 preferably transmits infrared radiation, illustrated diagrammatically by arrows 22 in FIG. 2, and reflects ultraviolet radiation 24 in the emitted radiation 21 that is incident. As is known in the art, one familiar method for achieving this result is to coat the inner surface 43 of each reflector panel 46 with a dichroic coating (not shown). The dichroic coating on reflector 42 usually constitutes a periodic multilayer film composed of diverse dielectric materials having alternating high and low refractive index. Since the coating is non-metallic, microwave radiation from the pair of magnetrons 12 that is downwardly incident on the backside of reflector 42 will not significantly interact with, or be absorbed by, the modulated layers and will be readily transmitted for ionizing the gas mixture in bulb 20. An exemplary coating is a Balzers #UNS200-S multilayered coating which is highly reflective between for incident radiation having wavelengths between 220 nm and 440 nm.

As shown in FIG. 2, infrared radiation 22 is transmitted though the reflector 42 and channeled to the peripheries of the microwave chamber 14. Chamber walls 32, 34, 36, 38 absorb and thermally dissipate the infrared radiation 22. As a result, the substrate (not shown) is not irradiated by unwanted indirect infrared radiation 22 reflected from reflector 42. Alternatively, the reflector 42 may be operable to absorb the infrared radiation 22. By contrast, ultraviolet radiation 24 will be highly reflected by reflector 42 and directed towards the substrate (not shown) positioned at a predetermined distance beyond mesh screen 44 below the bottom of microwave chamber 14.

The pair of reflector panels 46 are mounted within the microwave chamber 14 through a pair of longitudinally spaced apart retainers 48 only one of which is shown (FIG. 2). Each reflector panel 46 has its lowest extremity 53 supported on a generally horizontal, inwardly directed flange 50 that extends inwardly from the each chamber side wall 36. A longitudinally extending intermediate member 52 is mounted within the microwave chamber 14 through a pair of slots 54 (FIG. 2) formed in the retainers 48. The intermediate member 52 is positioned in a spaced relationship to respective apexes 56 of the reflector panels 46, and also in a spaced relationship to the plasma bulb 20 to permit sufficient circulation of air to adequately cool the bulb 20. The intermediate member 52 may be made of a glass, such as PYREX®, and may be uncoated to be non-reflective of the ultraviolet radiation 24 emitted by bulb 20.

In accordance with an aspect of the present invention, the inner surface 43 of each reflector panel 46 represents a section of an aspheric mirror having a curvature specified by a non-quadratic mathematical relationship. For reference, a rectangular two-dimensional Cartesian coordinate system may be defined in FIG. 2 where an origin 58 is selected and each point in a plane normal to inner surface 43 is described by two coordinates (x, y) relative to origin 58. Each panel 46 is truncated at its respective apex 56 and is elevated at its lowest extremity 53 a predetermined distance 59 above the plane defined by y=0. In this Cartesian coordinate system, the curvature of the inner surface 43 of each reflector panel 46 is described by the mathematical relationship $(x/a)^{(2+n)} + (y/b)^{(2+m)} = 1$, where b is the semiminor axis of the curve and a is the semimajor axis of the curve.

To generate the surface of revolution presented by reflector 42, exponents n and m were selected to be 0.8 and 0.8, respectively. However, exponents n and m are not so limited and may have values smaller than about 2 and greater than or equal to 0, where at least one of n or m is greater than 0. Preferably, exponents n and m are in the range of about 0.7 to about 0.8. If n=0 and m=0, the mathematical relationship reduces to that of an ordinary ellipse and each panel 46 describes a section of an elliptic cylinder. It is appreciated that either panel 46 may be displaced in the x-direction or the y-direction within the boundaries of the microwave chamber 14, so that the respective inner surfaces 43 are no longer symmetrically positioned about plasma bulb 20, without departing from the spirit and scope of the present invention.

The curved surface defined by the above-referenced equation is extended longitudinally to form reflector 42. Plasma bulb 20 is positioned axially at or near a focus 60 of the reflector 42 so that ultraviolet radiation 24 emitted from plasma bulb 20 will be reflected downward by reflector 42 as approximately homocentric parallel rays through mesh screen 44 toward the substrate (not shown). Due to the mathematically-prescribed curvature of the inner surface 43, a relatively uniform irradiance or radiant flux density of ultraviolet radiation 24 will be delivered over a relatively large surface area of the substrate. Moreover, the uniform irradiance is achieved without interfering with the optimum dimensions of the microwave chamber 14.

By way of example, and not by way of limitation, an exemplary preferred embodiment of reflector 42 has a y-dimension to the truncated apex 56 of 2.964 inches and an x-dimension to the lowest extremity 53 of 1.574 inches, where each measurement is made from origin 58 to the inner concave surface 43 of each panel 46. Further, the exemplary preferred embodiment of reflector 42 has a longitudinal dimension, parallel to the axis of the lamp, of 9.882 inches and a nominal thickness of 0.125 inches. Further, each panel 46 of the exemplary preferred embodiment is elevated a predetermined distance 59 of 0.246 inches and the apexes 56 of the panels 46 are separated by a transverse gap of 0.708 inches.

Figure 3:
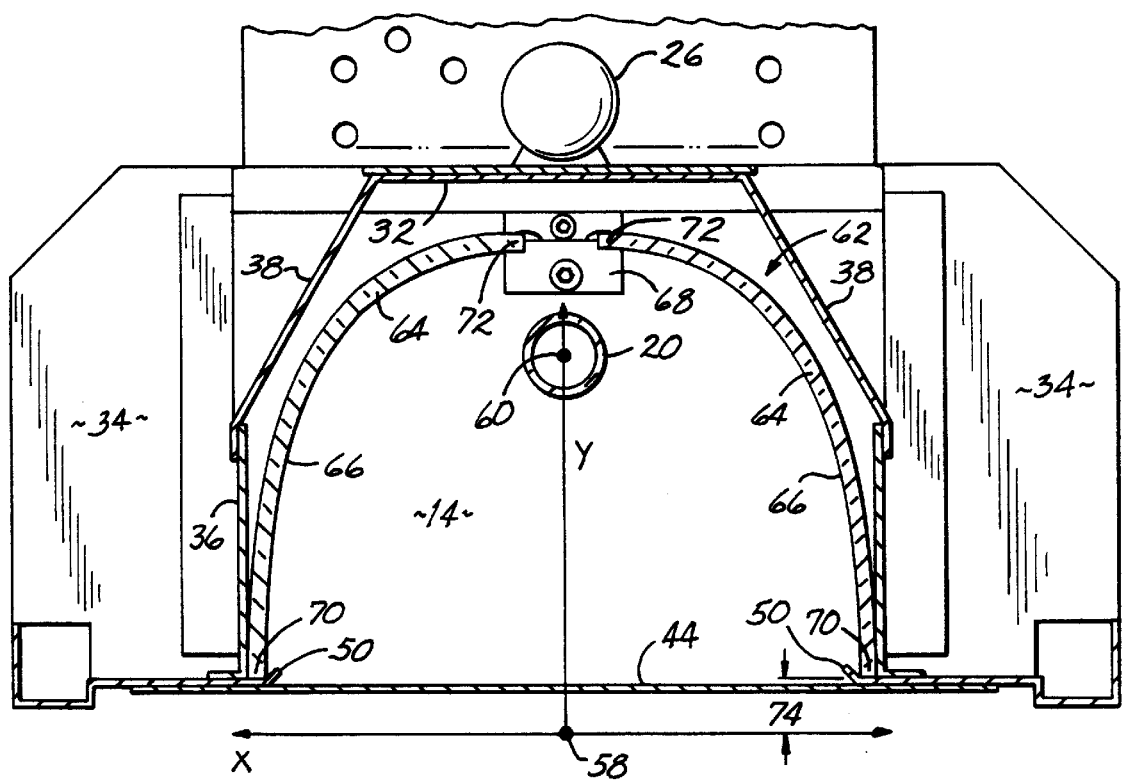
FIG. 3 is a cross-sectional view of an alternative embodiment of a two-panel reflector in accordance with the present invention for use in the lamp system of FIG. 1.

Using like reference numerals for like elements discussed with reference to FIGS. 1 and 2, an alternative embodiment of a reflector 62 in accordance with principles of the present invention is shown in FIG. 3. Reflector 62 includes a pair of longitudinally extending reflector panels 64 that are mounted within the microwave chamber 14 with the respective concave inner surfaces 66 in an opposing and facing relationship and with a spaced relationship relative to the plasma bulb 20. Each reflector panel 64 preferably has a curved inner surface 66 described by the mathematical relationship presented and discussed above with regard to reflector panel 46. To form reflector 62, exponents n and m were selected to be 0.7 and 0.7, respectively. The pair of reflector panels 64 is mounted within the microwave chamber 14 through a retainer 68, and each reflector panel 64 has its lowest extremity supported on a generally horizontal, inwardly directed flange 50 that extends inwardly from the each chamber side wall 36. Each panel 64 is truncated at its respective apex 72 and the lowest extremity 70 is elevated a predetermined distance 74 above the plane defined by x=0.

Reflector 62 operates in the same manner as discussed above with regard to reflector 42 (FIGS. 1 and 2) for delivering a relatively uniform irradiance of ultraviolet radiation 24 (FIG. 2) over a relatively large surface area of the substrate without interfering with the optimum dimensions of the microwave chamber 14.

By way of example, and not by way of limitation, an exemplary preferred embodiment of reflector 62 has a y-dimension to the truncated apex 72 of 2.976 inches and an x-dimension to the lowest extremity 70 of 1.969 inches, where each measurement is made from origin 58 to the inner concave surface 66 of each panel 64. Further, the exemplary preferred embodiment of reflector 62 has a longitudinal dimension, parallel to the axis of the lamp, of 5.787 inches and a nominal thickness of 0.125 inches. Further, each panel 64 of the exemplary preferred embodiment of reflector 62 is elevated a predetermined distance 74 of 0.250 inches and the apexes 72 of the panels 64 are separated by a transverse gap of 0.472 inches.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, the present invention could be used in any light-reflecting system having a source of radiation positioned at or near a foci of the reflector for delivering a relatively uniform irradiance over a relatively large surface area of a substrate or other target. The invention in its broader aspects is therefore not limited to the specific details, representative apparatus and method, and illustrative example shown and described. Accordingly, departures may be made from such details without departing from the spirit or scope of applicants' general inventive concept.

We claim:

1. A reflector for use in a lamp system having a longitudinally extending bulb, said reflector adapted to be mounted in spaced relationship to the longitudinally extending bulb, the curvature of a significant portion of said reflector being described in Cartesian coordinates by the equation $(x/a)^{(2+n)}+(y/b)^{(2+m)}=1$, where a and b are constants, n and m are exponents smaller than about 2 and greater than or equal to 0, and at least one of n or m is greater than 0.

2. The reflector of claim 1 wherein said reflector comprises at least two longitudinally extending reflector panels.

3. The reflector of claim 1 wherein said reflector further comprises:
   a first longitudinally extending reflector panel adapted to be mounted in spaced relationship to the bulb; and
   a second longitudinally extending reflector panel adapted to be mounted in opposing relationship to said first reflector panel and in spaced relationship to the bulb.

4. The reflector of claim 1 wherein the exponents n and m are equal.

5. The reflector of claim 1 wherein said reflector is capable of reflecting electromagnetic radiation having ultraviolet wavelengths in the range between about 200 nm and about 400 nm.

6. The reflector of claim 5 wherein said reflector is capable of at least partially transmitting or absorbing electromagnetic radiation having infrared wavelengths greater than about 750 nm.

7. The reflector of claim 1 wherein a surface of said reflector is coated with a dichroic coating that is capable of reflecting electromagnetic radiation having ultraviolet wavelengths and capable of at least partially transmitting or absorbing electromagnetic radiation having infrared wavelengths.

8. An apparatus for generating ultraviolet radiation, comprising:
   a longitudinally extending microwave chamber;
   a longitudinally extending bulb mounted within said microwave chamber;
   at least one microwave generator coupled to said microwave chamber and capable of generating a microwave energy field within said chamber for energizing said bulb to emit electromagnetic radiation; and
   a reflector adapted to be mounted in spaced relationship to the longitudinally extending bulb, the curvature of a significant portion of said reflector being described in Cartesian coordinates by the equation $(x/a)^{(2+n)}+(y/b)^{(2+m)}=1$, where a and b are constants, n and m are exponents smaller than about 2 and greater than or equal to 0, and at least one of n or m is greater than 0.

9. The reflector of claim 8 wherein said reflector comprises at least two longitudinally extending reflector panels.

10. The reflector of claim 8 wherein said reflector further comprises:
    a first longitudinally extending reflector panel adapted to be mounted in spaced relationship to the bulb; and
    a second longitudinally extending reflector panel adapted to be mounted in opposing relationship to said first reflector panel and in spaced relationship to the bulb.

11. The reflector of claim 8 wherein the exponents n and m are equal.

12. The reflector of claim 8 wherein said reflector is capable of reflecting electromagnetic radiation having ultraviolet wavelengths in the range between about 200 nm and about 400 nm.

13. The reflector of claim 12 wherein said reflector is capable of at least partially transmitting or absorbing electromagnetic radiation having infrared wavelengths greater than about 750 nm.

14. The reflector of claim 8 wherein a surface of each reflector is coated with a dichroic coating that is capable of reflecting electromagnetic radiation having ultraviolet wavelengths and capable of at least partially transmitting or absorbing electromagnetic radiation having infrared wavelengths.

15. An apparatus for generating a substantially uniform irradiance over a relatively large surface area of a target, comprising:
    a bulb having a longitudinal axis;
    a power supply operably connected to said bulb for energizing said bulb to emit electromagnetic radiation; and
    a reflector mounted in spaced relationship to the longitudinally extending bulb, the curvature of a significant portion of said reflector being described in Cartesian coordinates by the equation $(x/a)^{(2+n)}+(y/b)^{(2+m)}=1$, where a and b are constants, n and m are exponents smaller than about 2 and greater than or equal to 0, and at least one of n or m is greater than 0.

16. The reflector of claim 15 wherein the exponents n and m are equal.

* * * * *